US011223296B2

(12) United States Patent
Kashihara (10) Patent No.: US 11,223,296 B2
(45) Date of Patent: Jan. 11, 2022

(54) POWER CONVERSION DEVICE (71) Applicant: SANDEN HOLDINGS CORPORATION, Isesaki (JP)

(72) Inventor: Tatsuki Kashihara, Isesaki (JP)

(73) Assignee: SANDEN HOLDINGS CORPORATION, Isesaki (JP)

( * ) Notice: Subject to any disclaimer, the term of this patent is extended or adjusted under 35 U.S.C. 154(b) by 22 days.

(21) Appl. No.: 16/975,961

(22) PCT Filed: Feb. 5, 2019

(86) PCT No.: PCT/JP2019/004026
§ 371 (c)(1),
(2) Date: Aug. 26, 2020

(87) PCT Pub. No.: WO2019/171856
PCT Pub. Date: Sep. 12, 2019

(65) Prior Publication Data
US 2020/0403530 A1 Dec. 24, 2020

(30) Foreign Application Priority Data
Mar. 7, 2018 (JP) .............................. JP2018-040630

(51) Int. Cl.
*H02M 7/539* (2006.01)
*H02M 7/5395* (2006.01)
*H02P 27/08* (2006.01)

(52) U.S. Cl.
CPC ........ *H02M 7/5395* (2013.01); *H02P 27/085* (2013.01)

(58) Field of Classification Search
CPC ...... H02M 7/48; H02M 7/539; H02M 7/5395; H02P 27/085; H02P 27/08; H02P 27/06
See application file for complete search history.

(56) References Cited

U.S. PATENT DOCUMENTS

2012/0230067 A1* 9/2012 Yamanaka ............ H02M 5/293
363/37
2018/0278144 A1* 9/2018 Nakano ................. H02M 7/797
(Continued)

FOREIGN PATENT DOCUMENTS

JP 2005-168140 A 6/2005
JP 2012-023885 A 2/2012
(Continued)

OTHER PUBLICATIONS

Japan Patent Office, International Search Report issued in International Application No. PCT/JP2019/004026, dated Mar. 26, 2019.

*Primary Examiner* — Adolf D Berhane
(74) *Attorney, Agent, or Firm* — Baker Botts L.L.P.

(57) ABSTRACT

There is provided a power conversion device capable of effectively reducing a surge voltage generated by a parasitic inductance of a circuit. The power conversion device 1 is configured to operate a motor 8 driving a compression mechanism 7 of an electric compressor 16 by means of a three-phase inverter circuit 28 having a plurality of switching elements 18A to 18F. The power conversion device calculates a surge voltage value of each phase from a parasitic inductance of the circuit and phase currents iu, iv, and iw of the motor 8 to derive a phase in which the surge voltage value becomes maximum, and suppresses the switching of the switching elements 18A-18F of the phase having the maximum surge voltage value by a discontinuous modulation method.

9 Claims, 8 Drawing Sheets

(56) References Cited

U.S. PATENT DOCUMENTS

| | | | | |
|---|---|---|---|---|
| 2019/0199224 A1* | 6/2019 | Yukawa | ............ | H02M 7/53875 |
| 2019/0250046 A1* | 8/2019 | Sun | .......................... | G01K 7/01 |
| 2020/0389118 A1* | 12/2020 | Kashihara | ......... | H02M 7/53873 |

FOREIGN PATENT DOCUMENTS

| | | |
|---|---|---|
| JP | 2013-055801 A | 3/2013 |
| JP | 2013-240162 A | 11/2013 |
| JP | 2014-138526 A | 7/2014 |

* cited by examiner

METHOD OF CALCULATING SURGE VOLTAGE VALUE OF VOLTAGE MAXIMUM PHASE:
WHEN VOLTAGE MAXIMUM PHASE IS U PHASE
  WHEN DIRECTION OF U-PHASE CURRENT IS POSITIVE: $iu*Linup/\Delta t$
  WHEN DIRECTION OF U-PHASE CURRENT IS NEGATIVE: $iv*Lvun/\Delta t + iw*Lwun/\Delta t$  ※ WHEN $iv<0, iw=0$, WHEN $iv>iu, iv=-iu$, AND WHEN $iw>iu, iw=-iu$
WHEN VOLTAGE MAXIMUM PHASE IS V PHASE
  WHEN DIRECTION OF V-PHASE CURRENT IS POSITIVE: $iv*Linvp/\Delta t$
  WHEN DIRECTION OF V-PHASE CURRENT IS NEGATIVE: $iu*Luvn/\Delta t + iw*Lwvn/\Delta t$  ※ WHEN $iw<0, iw=0$, WHEN $iu<0, iu=0$, WHEN $iu>iv, iu=-iv$, AND WHEN $iw>iv, iw=-iv$
WHEN VOLTAGE MAXIMUM PHASE IS W PHASE
  WHEN DIRECTION OF W-PHASE CURRENT IS POSITIVE: $iw*Linwp/\Delta t$
  WHEN DIRECTION OF W-PHASE CURRENT IS NEGATIVE: $iv*Lvwn/\Delta t + iu*Luwn/\Delta t$  ※ WHEN $iv<0, iv=0$, WHEN $iu<0, iu=0$, WHEN $iu>iw, iu=-iw$, AND WHEN $iv>iw, iv=-iw$

METHOD OF CALCULATING SURGE VOLTAGE VALUE OF VOLTAGE MINIMUM PHASE:
WHEN VOLTAGE MINIMUM PHASE IS U PHASE
  WHEN DIRECTION OF U-PHASE CURRENT IS POSITIVE: $-iv*Lvup/\Delta t - iw*Lwup/\Delta t$  ※ WHEN $iv>0, iw=0$, WHEN $-iv>iu, iv=-iu$, AND WHEN $-iw>iu, iw=-iu$
  WHEN DIRECTION OF U-PHASE CURRENT IS NEGATIVE: $-iu*Linun/\Delta t$
WHEN VOLTAGE MINIMUM PHASE IS V PHASE
  WHEN DIRECTION OF V-PHASE CURRENT IS POSITIVE: $-iu*Luvp/\Delta t - iw*Lwvp/\Delta t$  ※ WHEN $iw>0, iw=0$, WHEN $iu>0, iu=0$, WHEN $-iu>iv, iu=-iv$, AND WHEN $-iw>iv, iw=-iv$
  WHEN DIRECTION OF V-PHASE CURRENT IS NEGATIVE: $-iv*Linvn/\Delta t$
WHEN VOLTAGE MINIMUM PHASE IS W PHASE
  WHEN DIRECTION OF W-PHASE CURRENT IS POSITIVE: $-iv*Lvwp/\Delta t - iu*Luwp/\Delta t$  ※ WHEN $iv>0, iu=0$, WHEN $-iu>iw, iu=-iw$, AND WHEN $-iv>iw, iv=-iw$
  WHEN DIRECTION OF W-PHASE CURRENT IS NEGATIVE: $-iw*Linwn/\Delta t$ $$\begin{bmatrix} L_{up} \\ L_{wup} \\ L_{vp} \\ L_{wvp} \\ L_{uwp} \\ L_{vwp} \end{bmatrix} = \begin{bmatrix} L_{up} \\ L_{up} \\ L_{uvp} + L_{vp} \\ L_{vp} \\ L_{uvp} + L_{vwp} + L_{wp} \\ L_{vwp} + L_{wp} \end{bmatrix}$$

$$\begin{bmatrix} L_{inup} \\ L_{invp} \\ L_{inwp} \end{bmatrix} = \begin{bmatrix} L_{inp} + L_{up} \\ L_{inp} + L_{uvp} + L_{vp} \\ L_{inp} + L_{uvp} + L_{vwp} + L_{wp} \end{bmatrix}$$

$$\begin{bmatrix} L_{vun} \\ L_{wun} \\ L_{uvn} \\ L_{wvn} \\ L_{uwn} \\ L_{vwn} \end{bmatrix} = \begin{bmatrix} L_{uvn} + L_{vn} \\ L_{uvn} + L_{vwn} + L_{wn} \\ L_{un} \\ L_{vwn} + L_{wn} \\ L_{un} \\ L_{vn} \end{bmatrix}$$

$$\begin{bmatrix} L_{inun} \\ L_{invn} \\ L_{inwn} \end{bmatrix} = \begin{bmatrix} L_{inn} + L_{un} \\ L_{inn} + L_{uvn} + L_{vn} \\ L_{inn} + L_{uvn} + L_{vwn} + L_{wn} \end{bmatrix}$$

POWER CONVERSION DEVICE

CROSS-REFERENCE TO RELATED APPLICATIONS

This application is a U.S. National Stage Patent Application under 35 U.S.C. § 371 of International Patent Application No. PCT/JP2019/004026, filed on Feb. 5, 2019, which claims the benefit of Japanese Patent Application No. 2018-040630, filed on Mar. 7, 2018, the disclosures of each of which are incorporated herein by reference in their entirety.

TECHNICAL FIELD

The present invention relates to a power conversion device which drives a motor by a three-phase inverter circuit.

BACKGROUND ART

Conventionally, a power conversion device for driving a motor configures a three-phase inverter circuit by a plurality of switching elements and PWM (Pulse Width Modulation)—controls the switching elements of each phase of UVW. Since, however, a parasitic inductance exists in the circuit, a high surge voltage is generated with ON and OFF of the switching element.

Therefore, there has also been developed a power conversion device which sets the timing of a disconnection/connection operation (OFF/ON operation) of each switching element in detail in such a manner that the direction of a current change caused by the OFF/ON operation of the switching element (switch element) and the direction of a current change caused by the OFF/ON operation of the other switching element are opposite to each other (refer to, for example, Patent Document 1).

CITATION LIST

Patent Documents

Patent Document 1: Japanese Patent Application Laid-Open No. 2013-55801
Patent Document 2: Japanese Patent Application Laid-Open No. 2014-138526

SUMMARY OF THE INVENTION

Problems to be Solved by the Invention

However, since the parasitic inductance of the circuit varies depending on the configuration and each phase, it is difficult to make an essential improvement. On the other hand, there has also recently been proposed a power conversion device (inverter control device) in which a method called discontinuous modulation is applied to this PWM control unit for the purpose of improving efficiency by reducing loss and heat generation of the switching element. (refer to, for example, Patent Document 2).

The present invention has been made in consideration of such a conventional situation, and an object of the present invention is to provide a power conversion device capable of effectively reducing a surge voltage generated by a parasitic inductance of a circuit.

Means for Solving the Problems

A power conversion device of the present invention is configured to drive a motor by a three-phase inverter circuit having a plurality of switching elements and is characterized in that the power conversion device calculates a surge voltage value of each phase from a parasitic inductance of the circuit and a phase current of the motor to derive a phase in which the surge voltage value becomes maximum, thereby suppressing the switching of the switching elements of the phase having the maximum surge voltage value.

The power conversion device of the invention of claim 2 is characterized in that in the above invention, the parasitic inductance of the circuit differs for each phase.

The power conversion device of the invention of claim 3 is characterized in the above respective inventions by including a phase voltage command operation unit which calculates a sinusoidal modulation voltage command value to be applied to the motor, an inter-line modulation operation unit which calculates a discontinuous modulation voltage command value allowing ON/OFF states of predetermined one-phase switching elements of the three-phase inverter circuit to be fixed in a specified section of PWM or the like and modulating ON/OFF states of other two-phase switching elements, based on the sinusoidal modulation voltage command value, and a PWM signal generation unit which generates a PWM signal PWM-controlling the three-phase inverter circuit, based on the discontinuous modulation voltage command value, and in that the inter-line modulation operation unit calculates the surge voltage value of each phase from the parasitic inductance of the circuit and the phase current of the motor to derive the phase in which the surge voltage value becomes maximum, thereby fixing the switching element of the phase having the maximum surge voltage value to the ON or OFF state.

The power conversion device of the invention of claim 4 is characterized in that in the above invention, the inter-line modulation operation unit compares the surge voltage values of the maximum phase and the minimum phase of the sinusoidal modulation voltage command value and fixes the switching element of the larger phase to the ON or OFF state.

The power conversion device of the invention of claim 5 is characterized in that in the above respective inventions, the motor drives a compression mechanism of an electric compressor.

Advantageous Effect of the Invention

According to the present invention, in a power conversion device including a three-phase inverter circuit having a plurality of switching elements to drive a motor, the power conversion device calculates a surge voltage value of each phase from a parasitic inductance of the circuit and a phase current of the motor to derive a phase in which the surge voltage value becomes maximum, thereby suppressing the switching of the switching elements of the phase having the maximum surge voltage value. Therefore, the phase in which the surge voltage value becomes maximum can be derived from the parasitic inductance of the circuit grasped in advance and the phase current flowing in the motor, and hence the switching itself of the switching elements, which is the cause of generation of the surge voltage, can be suppressed in the phase where the surge voltage value becomes maximum.

It is thus possible to effectively suppress the surge voltage generated in the circuit. In particular, in the motor which drives the compression mechanism of the electric compressor as in the invention of claim 5, the parasitic inductance of the circuit differs for each phase as in the invention of claim 2 because a structure becomes complicated, and hence the present invention becomes extremely effective.

Further, as in the invention of claim 3, there are provided a phase voltage command operation unit which calculates a sinusoidal modulation voltage command value to be applied to the motor, an inter-line modulation operation unit which calculates a discontinuous modulation voltage command value allowing ON/OFF states of predetermined one-phase switching elements of the three-phase inverter circuit to be fixed in a specified section of PWM or the like and modulating ON/OFF states of other two-phase switching elements, based on the sinusoidal modulation voltage command value, and a PWM signal generation unit which generates a PWM signal PWM-controlling the three-phase inverter circuit, based on the discontinuous modulation voltage command value. The inter-line modulation operation unit calculates the surge voltage value of each phase from the parasitic inductance of the circuit and the phase current of the motor to derive the phase in which the surge voltage value becomes maximum, thereby fixing the switching element of the phase having the maximum surge voltage value to an ON or OFF state. Consequently, it is possible to appropriately suppress the switching of the switching elements of the phase maximum in the surge voltage value by using a so-called discontinuous modulation method.

In this case, as in the invention of claim 4, the inter-line modulation operation unit compares the surge voltage values of the maximum phase and the minimum phase of the sinusoidal modulation voltage command value and fixes the switching element of the larger phase to the ON or OFF state. Consequently, it is possible to effectively suppress the surge voltage generated in the circuit while performing the PWM control of the motor by the discontinuous modulation method without any trouble.

BRIEF DESCRIPTION OF THE DRAWINGS

FIG. 6 is a diagram describing a method of calculating surge voltage values of a voltage maximum value and a voltage minimum value in the equivalent circuit of FIG. 4.

MODE FOR CARRYING OUT THE INVENTION

Hereinafter, embodiments of the present invention will be described in detail based on the drawings. First, an electric compressor (a so-called inverter-integrated electric compressor) 16 according to an embodiment integrally provided with a power conversion device 1 of the present invention will be described with reference to FIG. 2 and FIG. 3. Incidentally, the electric compressor 16 according to the embodiment constitutes a part of a refrigerant circuit of a vehicle air conditioning device mounted on a vehicle such as an engine driven car, a hybrid car, an electric vehicle, or the like.

(1) Configuration of Electric Compressor 16

Figure 2:
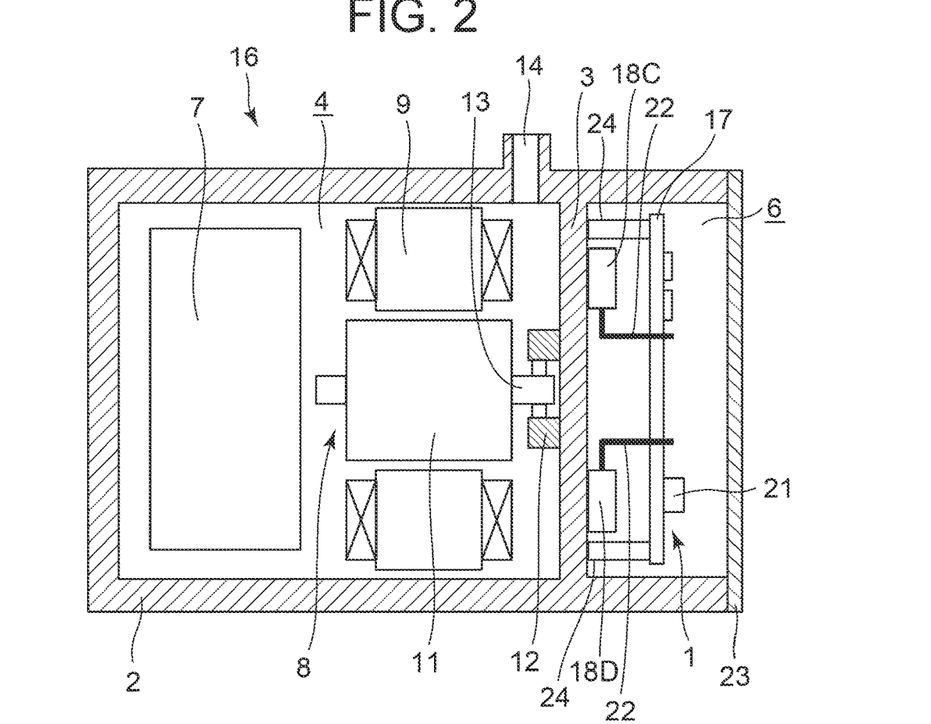
FIG. 2 is a longitudinal cross-sectional side view of an electric compressor of one embodiment provided with the power conversion device of FIG. 1.

In FIG. 2, the inside of a metal (aluminum or the like)— made cylindrical housing 2 of the electric compressor 16 is partitioned into a compression mechanism housing part 4 and an inverter housing part 6 by a partition wall 3 intersecting an axial direction of the housing 2. For example, a scroll-type compression mechanism 7 and a motor 8 which drives this compression mechanism 7 are accommodated in the compression mechanism housing part 4. In this case, the motor 8 is an IPMSM (Interior Permanent Magnet Synchronous Motor) composed of a stator 9 fixed to the housing 2 and a rotor 11 rotating inside the stator 9.

A bearing portion 12 is formed at the central portion of the partition wall 3 on the compression mechanism housing part 4 side. One end of a drive shaft 13 of the rotor 11 is supported by the bearing portion 12, and the other end of the drive shaft 13 is linked to the compression mechanism 7. A suction port 14 is formed in the vicinity of the partition wall 3 at a position corresponding to the compression mechanism housing part 4 of the housing 2. When the rotor 11 (drive shaft 13) of the motor 8 is rotated to drive the compression mechanism 7, a low temperature refrigerant which is a working fluid, flows from the suction port 14 into the compression mechanism housing part 4 of the housing 2 and is sucked into and compressed by the compression mechanism 7.

Then, the refrigerant compressed by the compression mechanism 7 and brought to a high temperature and high pressure is configured to be discharged from an unshown discharge port to the refrigerant circuit outside the housing 2. Further, since the low temperature refrigerant flowing from the suction port 14 passes near the partition wall 3 and passes around the motor 8 and is sucked by the compression mechanism 7, the partition wall 3 is also cooled.

And then, the power conversion device 1 of the present invention which drives and controls the motor 8 is housed in the inverter housing part 6 partitioned from the compression mechanism housing part 4 by the partition wall 3. In this case, the power conversion device 1 is configured to supply power to the motor 8 through a sealing terminal and a lead wire penetrating the partition wall 3.

(2) Structure of Power Conversion Device 1 (Arrangement on Substrate 17)

In the case of the embodiment, the power conversion device 1 is composed of a substrate 17, a plurality (six) of switching elements 18A to 18F each connected to an electric circuit wiring on one surface side of the substrate 17, a control unit 21 connected to an electric circuit wiring on the other surface side of the substrate 17, an HV connector, an LV connector, etc. which are not shown in the drawing. In the embodiment, the switching elements 18A to 18F are constituted of an insulated gate bipolar transistor (IGBT) or the like m which a MOS structure is incorporated in a gate portion.

In this case, in the embodiment, the switching element 18A at an upper phase of a U-phase inverter 19U of a below-mentioned three-phase inverter circuit (three-phase inverter circuit) 28 and the switching element 18D at a lower phase thereof the switching element 18B at an upper phase of a V-phase inverter 19V and the switching element ISE at a lower phase thereof, and the switching element 18C at an upper phase of a W-phase inverter 19W and the switching element 18F at a lower phase thereof are in the form of being arranged two by two respectively. The thus-arranged respective pairs of switching elements 18A and 18D, switching elements 18B and 18E, and switching elements 18C and 18F are radially disposed around the center of the substrate 17 as shown in FIG. 3.

Figure 3:
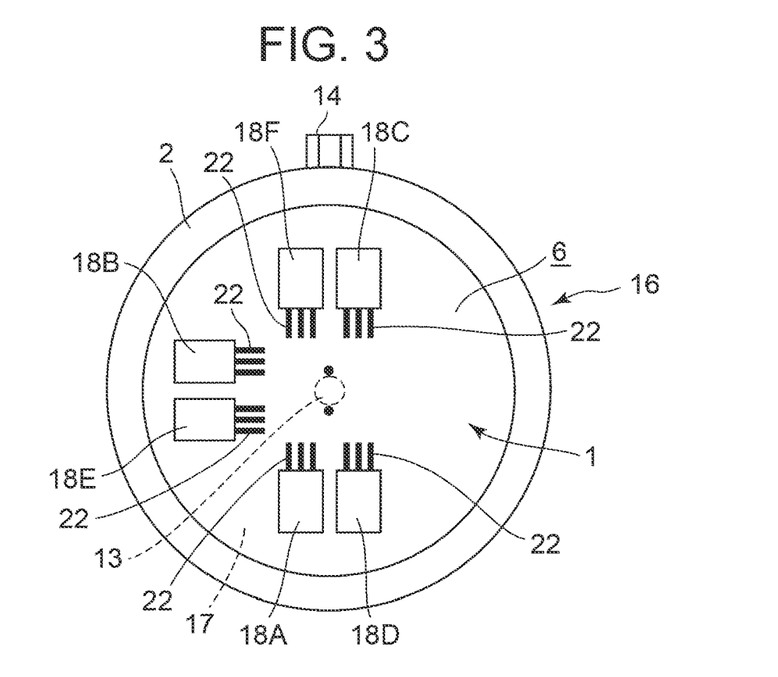
FIG. 3 is a side view of the electric compressor of FIG. 2 as viewed from the side of an inverter housing part except for a cover and a substrate.

Incidentally, in this application, the term "radial" also includes a U-shape as shown in FIG. 3. Further, the respective switching elements 18A to 18F may be disposed in a circular arc (fan shape) around the center of the substrate 17 without being limited to the arrangement shown in FIG. 3.

Further, in the embodiment, the switching elements 18C and 18F of the W-phase inverter 19W are located on the suction port 14 side. On the other hand, the switching elements 18B and 18E of the V-phase inverter 19V are arranged at positions turned at 90° counterclockwise in FIG. 3. The switching elements 18A and 18D of the U-phase inverter 19U are arranged at positions opposite to the suction port 14.

Further, terminal portions 22 of the respective switching elements 18A to 18F are connected to the substrate 17 in a state in which they are on the center side of the substrate 17. Furthermore, in this embodiment, current sensors 26A and 26B comprised of current transformers for measuring a U-phase current iu, a V-phase current iv, and a W-phase current iw each being a motor current (phase current) of each phase are provided. The respective current sensors 26A and 26B are connected to the control unit 21. Incidentally, the current sensor 26A measures the U-phase current iu, and the current sensor 26B measures the V-phase current iv. Then, the W-phase current iw is determined by calculation from these. Further, as in the embodiment, the control unit 21 may estimate them from the driving state of the motor 8 except that the motor currents of the respective phases are measured by the current sensors 26A and 26B.

Then, the power conversion device 1 assembled in this manner is accommodated in the inverter housing part 6 in a state in which one surface side of the respective switching elements 18A to 18F being present is on the partition wall 3 side, attached to the partition wall 3 and closed with a cover 23. In this case, the substrate 17 is fixed to the partition wall 3 via boss portions 24 which stand up from the partition wall 3.

Thus, in the state in which the power conversion device 1 is attached to the partition wall 3, the respective switching elements 18A to 18F are in close contact with the partition wall 3 directly or through a predetermined insulating heat conductive material and have heat exchange relation with the partition wall 3 of the housing 2. At this time, the respective switching elements 18A to 18F are disposed at positions avoiding locations corresponding to the bearing portion 12 and the drive shaft 13 and are arranged so as to surround their peripheries (FIG. 3).

Further, since the partition wall 3 is cooled by the refrigerant sucked into the compression mechanism housing part 4 as described above, the respective switching elements 18A to 18F are in heat exchange relation with the sucked refrigerant via the partition wall 3 and cooled by the refrigerant sucked into the compression mechanism housing part 4 through the thickness of the partition wall 3. The respective switching elements 18A to 18F themselves dissipate heat to the refrigerant through the partition wall 3.

(3) Configuration of Electric Circuit of Power Conversion Device 1

Figure 1:
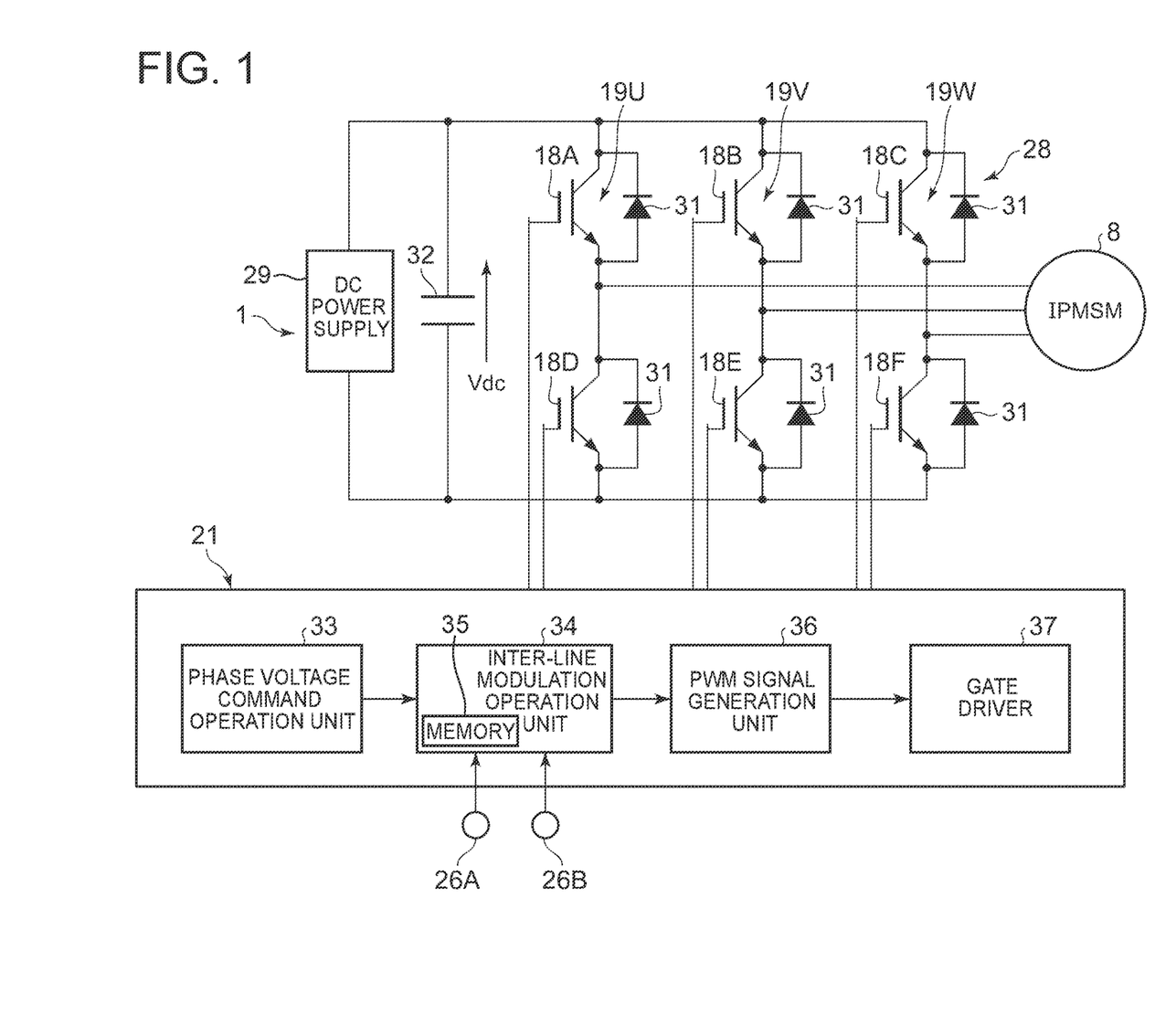
FIG. 1 is an electric circuit diagram of a power conversion device according to one embodiment of the present invention.

Next, in FIG. 1, the power conversion device 1 includes the three-phase inverter circuit (three-phase inverter circuit) 28 and the control unit 21 described above. The inverter circuit 28 is a circuit which converts a DC voltage of a DC power supply (battery: 300V, for example) 29 into a three-phase AC voltage and applies it to an armature coil of the stator 9 of the motor 8. This inverter circuit 28 has the U-phase inverter 19U, the V-phase inverter 19V, and the W-phase inverter 19W described above. The phase inverters 19U to 19W respectively have the above-described upper phase switching elements 18A to 18C and lower phase switching elements 18D to 18F individually. Further, fly-wheel diodes 31 are connected in antiparallel to the switching elements 18A to 18F respectively.

Then, the upper end sides of the upper phase switching elements 18A to 18C of the inverter circuit 28 are connected to a positive electrode side bus of the DC power supply 29 and a smoothing capacitor 32. Incidentally, although the smoothing capacitor 32 is also connected to the electric circuit wiring on one surface side of the substrate 17 to constitute the power conversion device 1, it is not shown in FIG. 2 and FIG. 3 in order to make the arrangement of the respective switching elements 18A to 18F easy to understand. On the other hand, the lower end sides of the lower phase switching elements 18D to 18F of the inverter circuit 28 are connected to a negative electrode side bus of the DC power supply 29 and the smoothing capacitor 32.

Further, the U-phase inverter 19U is connected to the U-phase armature coil of the motor 8 between the upper phase switching element 18A of the U-phase inverter 19U and the lower phase switching element 18D thereof. The V-phase inverter 19V is connected to the V-phase armature coil of the motor 8 between the upper phase switching element 18B of the V-phase inverter 19V and the lower phase switching element 18E thereof. The W-phase inverter 19W is connected to the W-phase armature coil of the motor 8 between the upper phase switching element 18C of the W-phase inverter 19W and the lower phase switching element 18F thereof.

(4) Configuration of Control Unit 21

Next, the control unit 21 is configured of a microcomputer having a processor. The control unit 21 receives a rotation speed command value from the vehicle ECU, receives a phase current from the motor 8, and controls ON/OFF states of the switching elements 18A to 18F of the inverter circuit 28, based on these. Specifically, the control unit 21 controls a gate voltage applied to a gate terminal of each of the switching elements 18A to 18F.

The control unit 21 has a phase voltage command operation unit 33, an inter-line modulation operation unit 34, a PWM signal generation unit 36, and a gate driver 37. The phase voltage command operation unit 33 calculates sinusoidal modulation voltage command values U' (U-phase voltage command value). V' (V-phase voltage command value), and W' (W-phase voltage command value) each of which is applied to the armature coil of each phase of the motor 8, based on the electrical angle, current command value and phase current of the motor 8. The sinusoidal modulation voltage command values U', V', and W' are values after normalization (after correction to −1 to 1) of the voltage command value where sinusoidal modulation control of the motor 8 is performed, and an example thereof is shown in the uppermost stage of FIG. 9.

The inter-line modulation operation unit 34 calculates discontinuous modulation voltage command values U (U-phase voltage command value), V (V-phase voltage command value), and W (W-phase voltage command value) on the basis of the calculated sinusoidal modulation voltage command values U', V', and W' calculated by the phase voltage command operation unit 33. The U-phase current iu and V-phase current iv measured by the aforementioned current sensors 26A and 26B respectively are input to the inter-line modulation operation unit 34, and the inter-line modulation operation unit 34 determines the phase currents (U-phase current iu. V-phase current iv, and W-phase current iw) of the motor 8. Incidentally, the operation of this inter-line modulation operation unit 34 will be described in detail later.

The PWM signal generation unit 36 generates, based on the calculated discontinuous modulation voltage command values U, V, and W calculated by the inter-line modulation operation unit 34. PWM signals Vu, Vv, and Vw which become drive command signals for the U-phase inverter 19U, the V-phase inverter 19V, and the W-phase inverter 19W of the inverter circuit 28, by comparing their magnitude with a carrier triangular wave.

The gate driver 37 generates, based on the PWM signals Vu, Vv, and Vw output from the PWM signal generation unit 36, gate voltages Vuu and Vul of the switching elements 18A and 18D of the U-phase inverter 19U, gate voltages Vvu and Vvl of the switching elements 18B and 18E of the V-phase inverter 19V, and gate voltages Vwu and Vwl of the switching elements 18C and 18F of the W-phase inverter 19W. These gate voltages Vuu, Vul, Vvu, Vvl, Vwu, and Vwl can be represented by a duty which is a time ratio of an ON state in a predetermined time.

Then, the respective switching elements 18A to 18F of the inverter circuit 28 are ON/OFF driven based on the gate voltages Vuu, Vul, Vvu, Vvl, Vwu, and Vwl output from the gate driver 37. That is, when the gate voltage is brought into an ON state (predetermined voltage value), the transistor is ON-operated. When the gate voltage is brought into an OFF state (zero), the transistor is OFF-operated. The gate driver 37 is a circuit for applying a gate voltage to the IGBT, based on the PWM signal when the switching elements 18A to 18F are the above-described IGBT, and is composed of a photocoupler, a logic IC, a transistor, or the like.

(5) Parasitic Inductance of Electric Circuit

Figure 4:
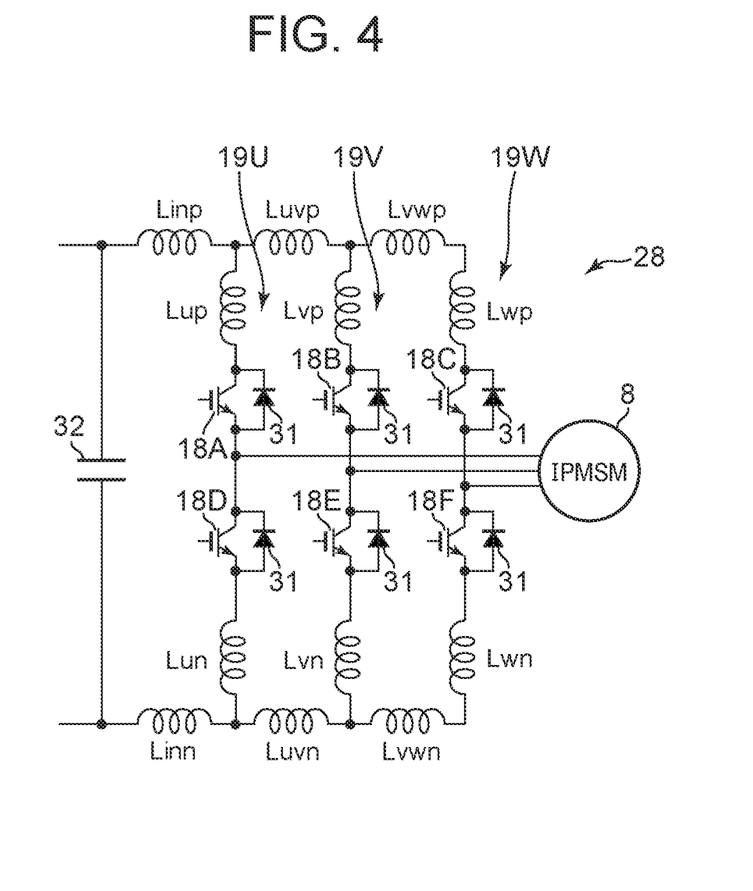
FIG. 4 is a diagram illustrating an example of an equivalent circuit for describing a parasitic inductance of a circuit in the power conversion device of FIG. 1.

Next, a parasitic inductance of an electric circuit of the three-phase inverter circuit 28 will be described with reference to FIG. 4. As in the embodiment, in the three-phase inverter circuit 28 of the power conversion device 1 provided in the electric compressor 16, the parasitic inductance also differs for each phase because its structure and electric circuit wiring become complex. The equivalent circuit of FIG. 4 shows an example of parasitic inductances included in the electric circuit of the three-phase inverter circuit 28 in the embodiment.

In this drawing, Linp is a parasitic inductance of the positive electrode side bus between the U-phase inverter 19U and the smoothing capacitor 32. Lup is a parasitic inductance between the collector of the upper phase switching element 18A of the U-phase inverter 19U and the positive electrode side bus, Lun is a parasitic inductance between the emitter of the lower phase switching element 18D of the U-phase inverter 19U and the negative electrode side bus, and Linn is a parasitic inductance of the negative electrode side bus between the U-phase inverter 19U and the smoothing capacitor 32.

Also, Luvp is a parasitic inductance of the positive electrode side bus between the U-phase inverter 19U and the V-phase inverter 19V, Lvp is a parasitic inductance between the collector of the upper phase switching element 18B of the V-phase inverter 19V and the positive electrode side bus, Lvn is a parasitic inductance between the emitter of the lower phase switching element 18E of the V-phase inverter 19V and the negative electrode side bus, and Luvn is a parasitic inductance of the negative electrode side bus between the U-phase inverter 19U and the V-phase inverter 19V.

Further, Lvwp is a parasitic inductance of the positive electrode side bus between the V-phase inverter 19V and the W-phase inverter 19W, Lwp is a parasitic inductance between the collector of the upper phase switching element 18C of the W-phase inverter 19W and the positive electrode side bus, Lwn is a parasitic inductance between the emitter of the lower phase switching element 18F of the W-phase inverter 19W and the negative electrode side bus, and Lvwn is a parasitic inductance of the negative electrode side bus between the V-phase inverter 19V and the W-phase inverter 19W. The values of the above-described parasitic inductances of the three-phase inverter circuit 28 are assumed to be measured in advance and stored in the memory 35 included in the inter-line modulation operation unit 34 of the control unit 21.

(6) Mechanism in which Surge Voltage Occurs

Next, a mechanism in which a surge voltage occurs in the equivalent circuit of FIG. 4 will be described with reference to FIG. 5. As described above, since the parasitic inductances different in each phase of UVW exist in the electric circuit of the three-phase inverter circuit 28, a surge voltage is generated when a current flows through the switching elements 18A to 18F upon switching of the switching elements 18A to 18F from ON to OFF.

Figure 5:
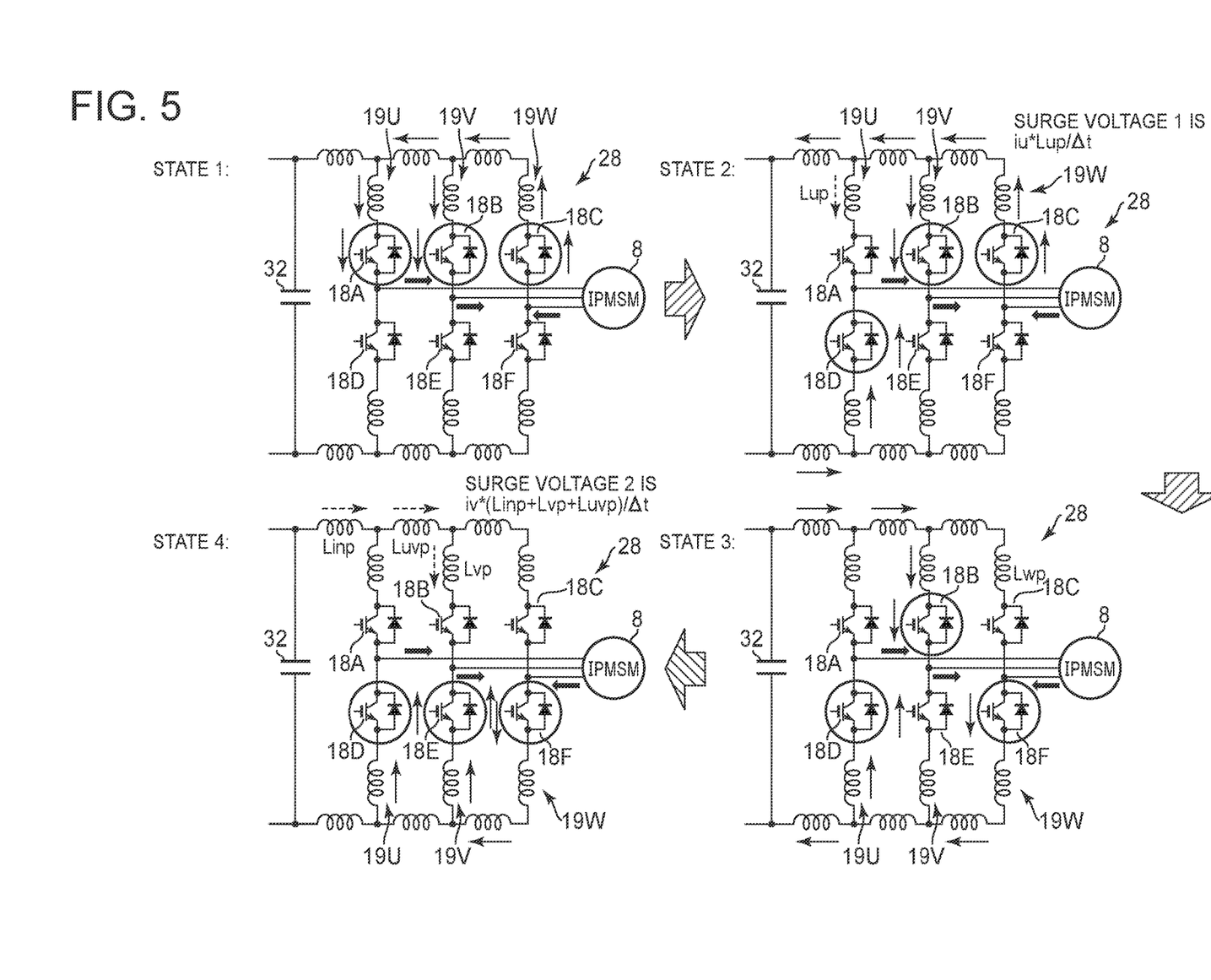
FIG. 5 is a diagram describing an example of a mechanism of generating a surge voltage in the equivalent circuit of FIG. 4.

Assume now that, for example, as shown in a state 1 in FIG. 5, the upper phase switching elements 18A to 18C of the inverters 19U to 19W of the respective phases of UVW are turned ON, and the lower phase switching elements 18D to 18F are turned OFF, and the current flows as indicated by arrows in the figure. Incidentally, it is assumed that each switching element circled in the figure is ON.

When the upper phase switching element 18A of the U-phase inverter 19U is turned OFF and the lower phase switching element 18D is turned ON as shown in a state 2 from the state 1, the current iu in the direction indicated by a broken line arrow flows in the parasitic inductance Lup of the state 2, and consequently a surge voltage 1 is generated. The value of this surge voltage 1 becomes iu*Lup/Δt. Here, although Δt is commonly given and described for all six phases by taking as an example a case where Δt is a coefficient which depends on the switching speed of the IGBT, and IGBT switching speeds of 6 phases set together in the upper and lower phases of the U phase, the V phase, and the W phase are the same. Δt is not limited to the case where Δt is common. When the switching speeds of the six phases are all different, the above can be considered similarly by giving different Δt to them.

Next, when the upper phase switching element 18C of the W-phase inverter 19W is turned OFF and the lower phase switching element 18F is turned ON from the state 2, a state 3 is obtained. At this time, since the current flowing through the switching element 18C in the state 2 is negative, no surge voltage is generated in the parasitic inductance Lwp. Actually, various factors can be considered for the surge voltage, but here, as an example, a surge voltage generated when turning OFF an IGBT conduction current is dominant.

When the upper phase switching element 18B of the V-phase inverter 19V is turned OFF and the lower phase switching element 18E is turned ON as shown in a state 4 from the state 3, a surge voltage 2 is generated because the current iv in the direction indicated by a broken arrow line flows into the parasitic inductance Linp, the parasitic inductance Lvp. and the parasitic inductance Luvp in the state 4. The value of the surge voltage 2 becomes iv*(Linp+Lvp+Luvp)/Δt. Here, if iv*(Linp+Lvp+Luvp)>iu*Lup, the surge voltage 2 becomes larger than the surge voltage 1.

(7) Operation of Inter-Line Modulation Operation Unit 34

Next, the operation/calculation operation of the discontinuous modulation voltage command values U, V, and W in the inter-line modulation operation unit 34 of the control unit 21 will be described in detail with reference to FIG. 6 to FIG. 9

(7-1) Method of Calculating Surge Voltage Values of Voltage Maximum Phase and Voltage Minimum Phase The inter-line modulation operation unit 34 calculates the surge voltage values of the voltage maximum phase and the voltage minimum phase for each switching of the switching elements 18A to 18F and compares their magnitude. Here, the voltage maximum phase means the phase of the maximum voltage command value of the sinusoidal modulation voltage command values U' (U-phase voltage command value), V' (V-phase voltage command value), and W' (W-phase voltage command value) calculated by the phase voltage command operation unit 33 (refer to the uppermost stage of FIG. 9). The voltage minimum phase similarly means the phase of the minimum voltage command value of the sinusoidal modulation voltage command values U' (U-phase voltage command value), V' (V-phase voltage command value), and W' (W-phase voltage command value) calculated by the phase voltage command operation unit 33.

For example, in the case of PWM output by a triangular wave carrier, when a PWM operation is started by turning ON the upper phase switching elements 18A to 18C, the inter-line modulation operation unit 34 calculates a surge voltage value by iu*Linup/Δt in the case where the direction of the U-phase current iu is positive when the voltage maximum phase is the U phase (when the U-phase voltage command value U' is maximum).

Further, when the direction of the U-phase current iu is negative, the inter-line modulation operation unit 34 calculates a surge voltage value by iv*Lvun/Δt+iw*Lwun/Δt (however, it is assumed that iv=0 when iv<0, iw=0 when iw<0, iv=−iu when iv>−iu, and iw=−iu when iw>−iu).

The inter-line modulation operation unit 34 calculates a surge voltage value by iu*Linvp/Δt in the case where the direction of the V-phase current iv is positive when the voltage maximum phase is the V phase (when the V-phase voltage command value V' is maximum).

Further, when the direction of the V-phase current iv is negative, the inter-line modulation operation unit 34 calculates a surge voltage value by iu*Luvn/Δt+iw*Lwvn/Δt (however, it is assumed that iw=0 when iw<0, iu=0 when iu<0, iu=−iv when iu>−iv, and iw=−iv when iw>−iv).

The inter-line modulation operation unit 34 calculates a surge voltage value by iw*Linwp/Δt in the case where the direction of the W-phase current iw is positive when the voltage maximum phase is the W phase (when the W-phase voltage command value W' is maximum).

Also, when the direction of the W-phase current iw is negative, the inter-line modulation operation unit 34 calculates a surge voltage value by iv*Lvwn/Δt+iu*Luwn/Δt (however, it is assumed that iv=0 when iv<0, iu=0 when iu<0, iu=−iw when iu>−iw, and iv=−iw when iv>−iw).

Further, the inter-line modulation operation unit 34 calculates a surge voltage value by (−iv)*Lvup/Δt+(−iw)*Lwup/Δt in the case where the direction of the U-phase current iu is positive when the voltage minimum phase is the U phase (when the U-phase voltage command value U' is minimum), (however, it is assumed that iv=0 when iv>0, iw=0 when iw>0, iv=−iu when −iv>iu, and iw=−iu when −iw>iu).

Also, when the direction of the U-phase current iu is negative, the inter-line modulation operation unit 34 calculates a surge voltage value by (−iu)*Linun/Δt.

The inter-line modulation operation unit 34 calculates a surge voltage value by (−iu)*Luvp/Δt+(−iw)*Lwvp/Δt in the case where the direction of the V-phase current iv is positive when the voltage minimum phase is the V phase (when the V-phase voltage command value V' is minimum) (however, it is assumed that iw=0 when iw>0, iu=0 when iu>0, iu=−iv when −iu>iv, and iw=−iv when −iw>iv).

Further, when the direction of the V-phase current iv is negative, the inter-line modulation operation unit 34 calculates a surge voltage value by (−iv)*Linvn/Δt.

The inter-line modulation operation unit 34 calculates a surge voltage value by (−iv)*Lvwp/Δt+(−iu)*Luvp/Δt when the direction of the W-phase current iw is positive when the voltage minimum phase is the W phase (when the W-phase voltage command value W' is minimum) (however, it is assumed that iv=0 when iv>0, iu=0 when iu>0, iu=−iw when −iu>iw, and iv=−iw when −iv>iw).

Further, when the direction of the W-phase current iw is negative, the inter-line modulation operation unit 34 calculates a surge voltage value by (−iw)*Linwn/Δt.

Incidentally, in the above, Lvup=Lup, Lwup=Lup, Luvp=Luvp+Lvp, Lwvp=Lvp, Luwp=Luvp+Lvwp+Lwp, and Lvwp=Lvwp+Lwp.

Also, Lvun=Luvn+Lvn, Lwun=Luvn+Lvwn+Lwn, Luvn=Lun, Lwvn=Lvwn+Lwn, Luwn=Lun, and Lvwn=Lvn.

Further, Linup=Linp+Lup, Linvp=Linp+Luvp+Lvp, and Linwp=Linp+Luvp+Lvwp+Lwp

Moreover, Linun=Linn+Lun, Linvn=Linn+Luvn+Lvn, and Linvn=Linn+Luvn+Lvwn+Lwn.

The above is collectively shown in FIG. 6. Here, the surge voltage 1 of FIG. 5 described previously is taken when the voltage minimum phase described above is the U phase and when the direction of the U-phase current iu is positive. At this time, the surge voltage 1 is calculated by (−iv)*Lvup/Δt+(−iw)*Lwup/Δt. However, iv=0 because iv is positive, and iw=−iu because −iw>iu. Thus, (−iv)*Lvup/Δt+(−iw)*Lwup/Δt is rewritten into iu*Lwup/Δt, and the surge voltage 1 becomes iu*Lup/Δt because Lwup=Lup.

Further, the surge voltage 2 in FIG. 5 described previously is taken when the aforementioned voltage maximum phase is the V phase and when the direction of the V-phase current iv is positive. At this time, the surge voltage 2 is calculated by iv*Linvp/Δt, but becomes iv*(Linp+Lvp+Luvp)/Δt because Linvp=Linp+Luvp+Lvp (7-2) Discontinuous Modulation Operation by Inter-Line Modulation Operation Unit 34

As described above, the inter-line modulation operation unit 34 calculates the surge voltage value of the maximum phase (voltage maximum phase) of the sinusoidal modulation voltage command values U', V', and W' and the surge voltage value of the minimum phase (voltage minimum phase) thereof for each switching, and compares their magnitude relations. Then, the inter-line modulation operation unit 34 derives the larger phase as the phase in which the surge voltage value becomes maximum. Next, the inter-line modulation operation unit 34 calculates and outputs the discontinuous modulation voltage command values U (U-phase voltage command value), V (V-phase voltage command value), and W (W-phase voltage command value) allowing the ON/OFF state of the switching element of the phase having the maximum surge voltage value to be fixed to the ON state (in the case of the voltage maximum phase) or the OFF state (in the case of the voltage minimum phase), and modulating the ON/OFF state of the switching element of the other phase. Consequently, the switching of each switching element of the phase having the maximum surge voltage is suppressed.

Figure 7:
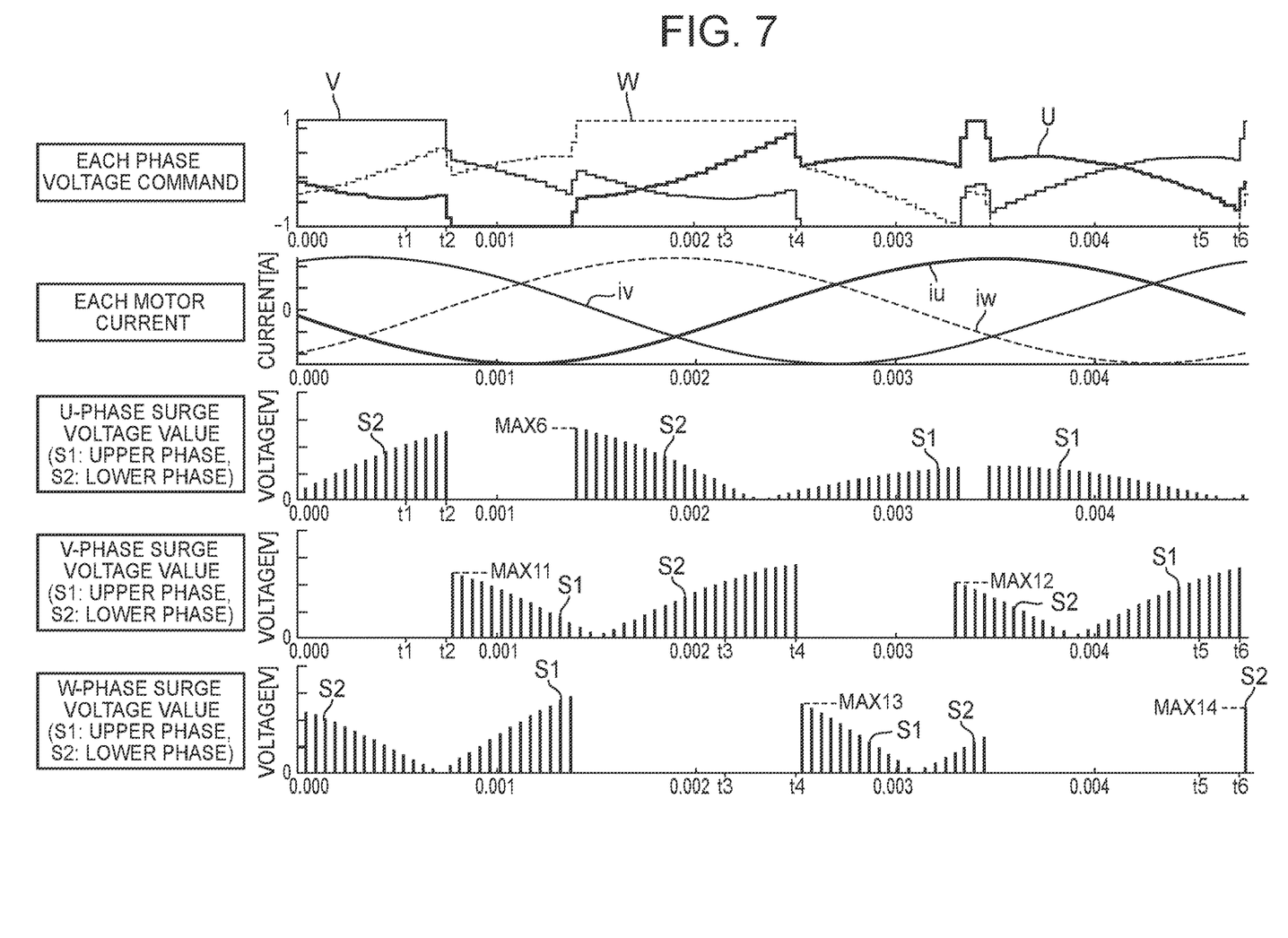
FIG. 7 is a diagram showing a surge voltage value generated in each phase where PWM control is performed by a discontinuous modulation method of the embodiment of the present invention in the power conversion device of FIG. 1.

FIG. 7 shows a U-phase voltage command value U, a V-phase voltage command value V. and a W-phase voltage command value W according to the discontinuous modulation method of the embodiment of the present invention, and a surge voltage generated in each phase when PWM control is performed using them. Incidentally, the discontinuous modulation voltage command values U, V, and W calculated by the inter-line modulation operation unit 34 are values after normalization of the voltage command value for performing the discontinuous modulation control of the motor 8 (after corrected to −1 to 1).

Figure 8:
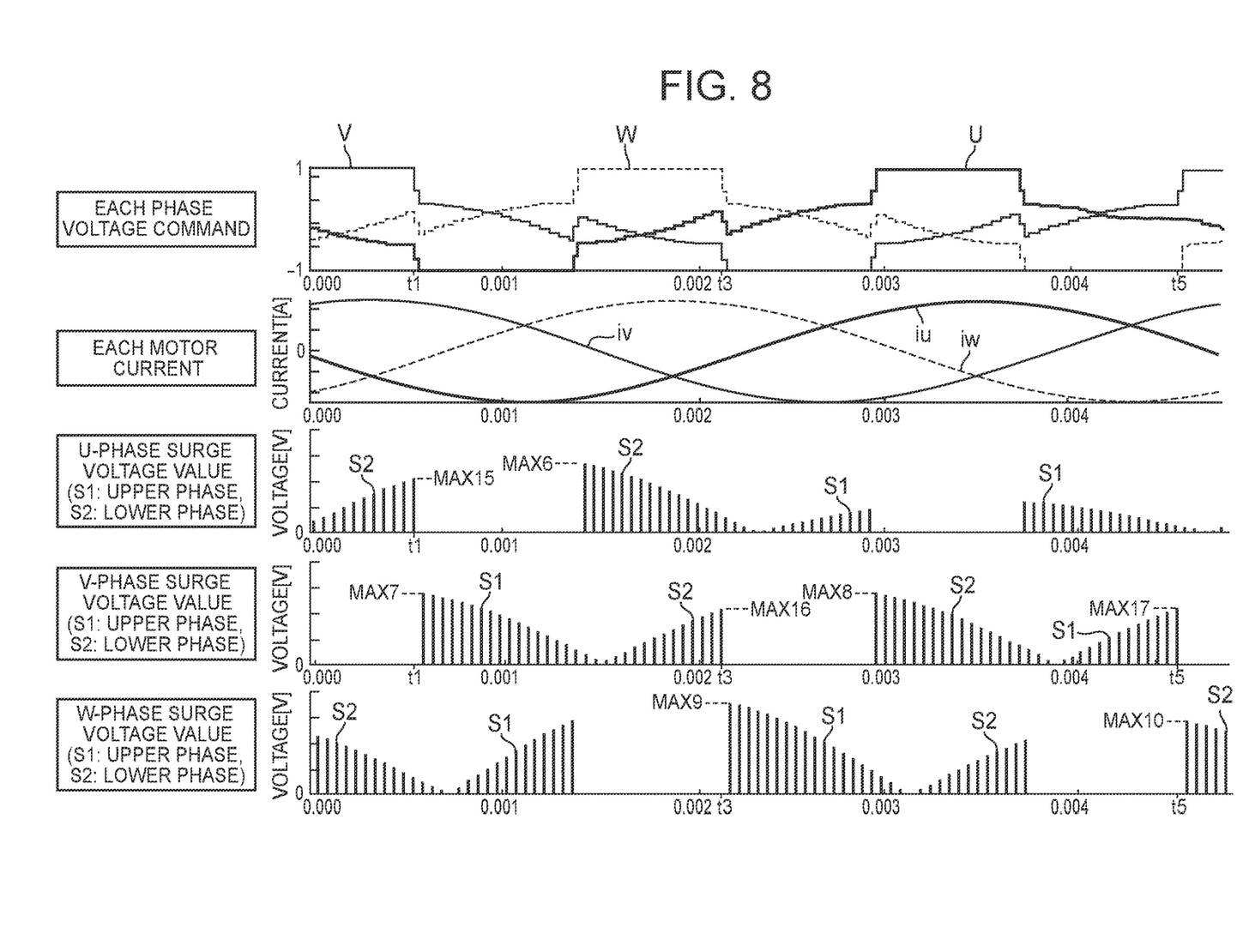
FIG. 8 is a diagram showing a surge voltage value generated in each phase where PWM control is performed by a normal discontinuous modulation method in the power conversion device of FIG. 1.
Figure 9:
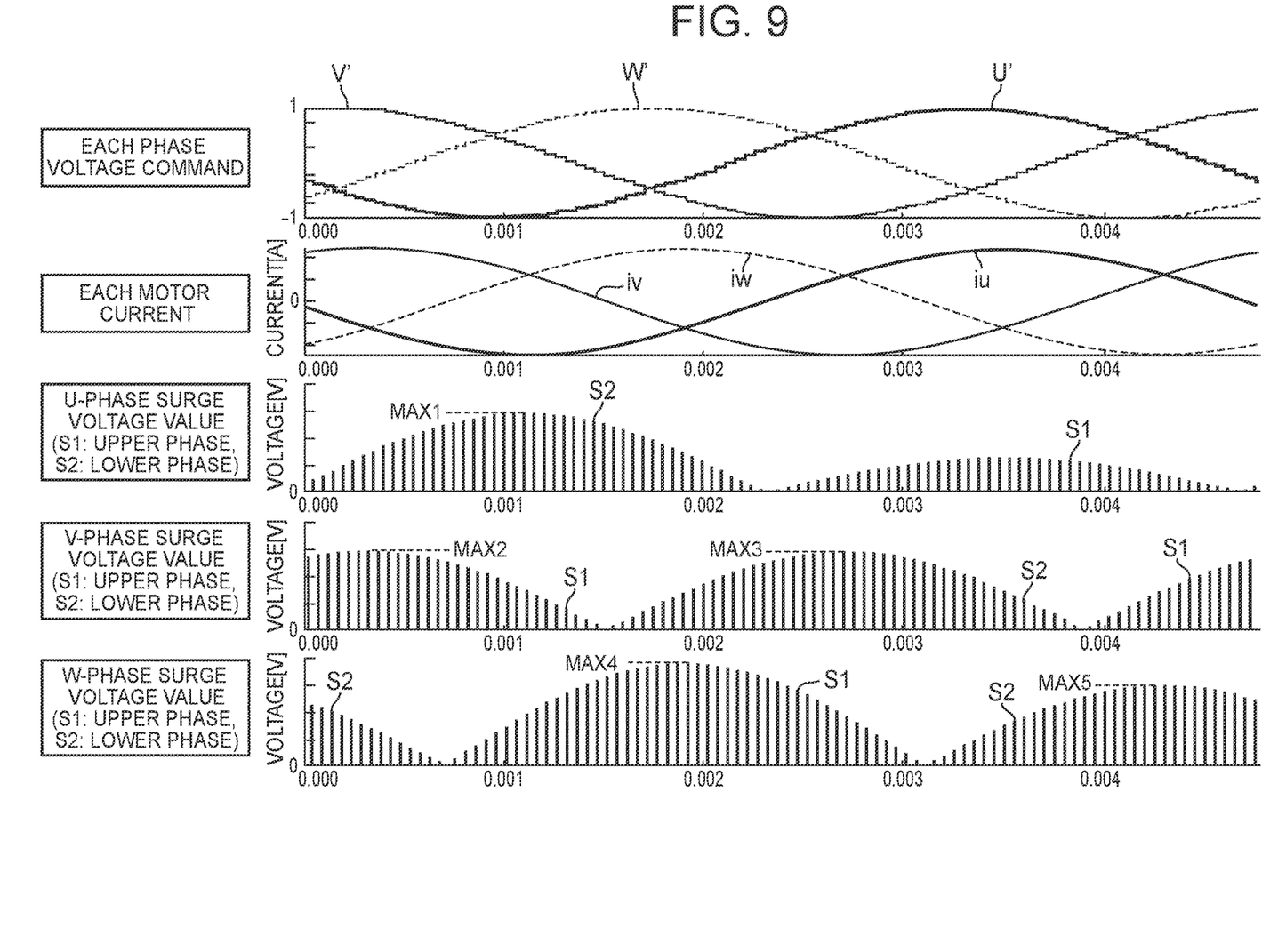
FIG. 9 is a diagram showing a surge voltage value generated in each phase where PWM control is performed by a sinusoidal modulation method in the power converter device of FIG. 1.

Further. FIG. 9 also shows a surge voltage value generated in each phase in the case of the sinusoidal modulation method in which the switching elements 18A to 18F are PWM-controlled by the sinusoidal modulation voltage command values U', V', and W' calculated by the phase voltage command operation unit 33 (S1 is the upper phase, S2 is the lower phase, and the same applies to the following). Further, FIG. 8 shows a surge voltage value generated in each phase in the case where PWM control is performed by the discontinuous modulation voltage command values U, V, and W calculated in the normal discontinuous modulation method, in order to perform comparison with the case of the discontinuous modulation method of the embodiment of the present invention in FIG. 7. This normal discontinuous modulation method is for comparing the sinusoidal modulation voltage command values U', V', and W' of each phase calculated by the phase voltage command operation unit 33, fixing the ON/OFF states of the switching elements 18A to 18F of the phase maximum in absolute value to the ON or OFF state, and thereby suppressing the switching of the switching elements 18A to 18F.

In the case of the sinusoidal modulation method of FIG. 9, it can be seen that surge voltages having surge voltage value MAX1 to MAX5 are generated in each phase, and in particular, the surge voltage having the largest surge voltage value MAX4 is generated in the W phase (incidentally, the value indicated by MAX in this figure is the peak value of each surge voltage value. The same applies hereinafter).

On the other hand, it can be seen that in the case of the normal discontinuous modulation method of FIG. 8, since the switching elements are fixed to the ON or OFF state at the timing when the surge voltage values MAX1 to MAX5 in the case of the sinusoidal modulation method of FIG. 9 are generated, the peak values are lowered as in the case where the surge voltage value MAX1 is lowered to a surge voltage value MAX6, the surge voltage value MAX2 is lowered to a surge voltage value MAX7, the surge voltage value MAX3 is lowered to a surge voltage value MAX8, the surge voltage value MAX4 is lowered to a surge voltage value MAX9, and the surge voltage value MAX5 is lowered to a surge voltage value MAX10, respectively.

On the other hand, in the case of the discontinuous modulation method of the embodiment of the present invention shown in FIG. 7, as described above, the magnitude relations between the surge voltage value of the voltage maximum phase and the surge voltage value of the voltage minimum phase are compared. The larger phase is derived as the phase in which the surge voltage value becomes maximum, and the ON/OFF state of the switching element of the phase having the maximum surge voltage value is fixed to the ON state (in the case of the voltage maximum phase) or OFF state (in the case of the voltage minimum phase) to suppress the switching of the switching element. Therefore, the V-phase surge voltage value MAX7 which is the voltage maximum phase at a time of t1 in FIG. 8 is larger than the surge voltage value (indicated by MAX15 in FIG. 8) of the U phase being the voltage minimum phase, and hence, the ON state of the V-phase switching element is extended to t2 in FIG. 7. Thus, it can be seen that the V-phase surge voltage value MAX7 in FIG. 8 is lowered to a surge voltage value MAX11 in FIG. 7.

Also, since the surge voltage value MAX9 of the W phase which is the voltage maximum phase at a time of t3 in FIG. 8 is larger than the surge voltage value (indicated by MAX16 in FIG. 8) of the V phase which is the voltage minimum phase, the ON state of the W-phase switching element is extended to t4 in FIG. 7. Consequently, the V-phase surge voltage value MAX9 in FIG. 8 is lowered to a surge voltage value MAX13 in FIG. 7.

Further, since the surge voltage value MAX10 of the W phase which is the voltage minimum phase at a time of t5 in FIG. 8 is larger than the surge voltage value (indicated by MAX17 in FIG. 8) of the V phase which is the voltage maximum phase, the OFF state of the W-phase switching element is extended to t6 in FIG. 7. Consequently, the W-phase surge voltage value MAX10 in FIG. 8 is lowered to a surge voltage value MAX14 in FIG. 7. That is, according to the discontinuous modulation method of the embodiment of the present invention, it can be seen that the peak of the surge voltage value is further suppressed even compared with the normal discontinuous modulation method.

As described above in detail, in the present invention, the surge voltage value of each phase of UVW is calculated from the parasitic inductance of the three-phase inverter circuit 28 and the phase currents (iu, iv, iw) of the motor 8, and the phase in which the surge voltage value becomes maximum is derived, thereby suppressing the switching of the switching elements of the phase having the maximum surge voltage value. Therefore, the phase in which the surge voltage value becomes maximum can be derived from the parasitic inductance of the circuit grasped in advance and the phase current flowing in the motor 8, and in the phase where the surge voltage value becomes maximum, the switching itself of the switching elements 18A to 18F, which is the cause of generation of the surge voltage, can be suppressed.

It is thus possible to effectively suppress the surge voltage generated in the circuit. In particular, in the power conversion device 1 applied to the motor 8 which drives the compression mechanism 7 of the electric compressor 16 as in the embodiment, the parasitic inductance of the circuit differs for each phase because the structure becomes complicated, and hence the present invention becomes extremely effective.

Further, in the embodiment, there are provided the phase voltage command operation unit 33 which calculates the sinusoidal modulation voltage command values U', V', and W' applied to the motor 8, the inter-line modulation operation unit 34 which, based on the sinusoidal modulation voltage command values U', V', and W', calculates the discontinuous modulation voltage command values U. V. and W allowing the ON/OFF state of the switching element of the predetermined one phase of the three-phase inverter circuit 28 to be fixed in the specified section of PWM or the like, and modulating the ON/OFF states of the switching elements of other two phases, and the PWM signal generation unit 36 generating the PWM signal to PWM-control the three-phase inverter circuit 28, based on the discontinuous modulation voltage command values U, V, and W. The inter-line modulation operation unit 34 calculates the surge voltage value of each phase from the parasitic inductance of the circuit and the phase current of the motor 8 to derive the phase in which the surge voltage value becomes maximum to thereby fix the switching element of the phase having the maximum surge voltage value to the ON or OFF state. Consequently, it is possible to appropriately suppress the switching of the switching elements of the phase maximum in the surge voltage value by using the discontinuous modulation method.

In this case, in the embodiment, the inter-line modulation operation unit 34 compares the surge voltage values of the maximum phase (voltage maximum phase) and the minimum phase (voltage minimum phase) of the sinusoidal modulation voltage command values U', V', and W' and fixes the switching element of the larger phase to the ON or OFF state. It is therefore possible to effectively suppress the surge voltage generated in the circuit while performing the PWM control of the motor 8 by the discontinuous modulation method without any trouble.

Incidentally, the equivalent circuit shown in FIG. 4 and the calculation methods collectively shown in FIG. 6 are examples. If the electric circuit wiring of the three-phase inverter circuit 28 differs, the equivalent circuit is different and the calculation method of the surge voltage value is also different. Further, in the embodiment, the method of calculating the surge voltage value in the case where the upper phase switching elements 18A to 18C are started as ON is shown, but in the case where the lower phase switching elements 18D to 18F are started as ON a different calculation method is taken.

Further, in the embodiment, the U-phase current iu, the V-phase current iv, and the W-phase current iw, which are the motor currents (phase currents) of each phase, are measured by the current sensors 26A and 26B each comprised of the current transformer. However, the present invention is not limited thereto, and the motor currents (phase currents) may be measured by a shunt resistance or other methods. Further, in the embodiment, the present invention is applied to the power conversion device 1 which drives and controls the motor 8 of the electric compressor 16, but the inventions other than claim 5 are not limited to it, and the present invention is effective in drive control of a motor for various devices.

DESCRIPTION OF REFERENCE NUMERALS

1 power conversion device
7 compression mechanism
8 motor
16 electric compressor
18A-18F switching element
19U U-phase inverter
19V V-phase inverter
19 W W-phase inverter
21 control unit
26A, 26B current sensor
28 three-phase inverter circuit
33 phase voltage command operation unit
34 inter-line modulation operation unit
36 PWM signal generation unit
37 gate driver.

The invention claimed is:

1. A power conversion device comprising a three-phase inverter circuit having a plurality of switching elements to drive a motor,
   wherein the power conversion device calculates a surge voltage value of each phase from a parasitic, inductance of the circuit and a phase current of the motor to derive a phase in which the surge voltage value becomes maximum, thereby suppressing the switching of the switching dements of the phase having the maximum surge voltage value.

2. The power conversion device according to claim 1, wherein the parasitic inductance of the circuit differs for each phase.

3. The power conversion device according to claim 1, including:
   a phase voltage command operation unit which calculates a sinusoidal modulation voltage command value to be applied to the motor,
   an inter-line modulation operation unit which calculates a discontinuous modulation voltage command value allowing ON/OFF states of predetermined one-phase switching elements of the three-phase inverter circuit to be fixed in a specified section and modulating ON/OFF states of other two-phase switching elements, based on the sinusoidal modulation voltage command value, and
   a PWM signal generation unit which generates a PWM signal PWM-controlling the three-phase inverter circuit, based on the discontinuous modulation voltage command value,
   wherein the inter-line modulation operation unit calculates the surge voltage value of each phase from the parasitic inductance of the circuit and the phase current of the motor to derive the phase in which the surge voltage value becomes maximum, thereby fixing the switching element of the phase having the maximum surge voltage value to an ON or OFF state.

4. The power conversion device according to claim 3, wherein the inter-line modulation operation unit compares the surge voltage values of the maximum phase and the minimum phase of the sinusoidal modulation voltage command value and fixes the switching element of the larger phase to the ON or OFF state.

5. The power conversion device according to claim 1, wherein the motor drives a compression mechanism of an electric compressor.

6. The power conversion device according to claim 2, including:
   a phase voltage command operation unit which calculates a sinusoidal modulation voltage command value to be applied to the motor,
   an inter-line modulation operation unit which calculates a discontinuous modulation voltage command value allowing ON/OFF states of predetermined one-phase switching elements of the three-phase inverter circuit to be fixed in a specified section and modulating ON/OFF states of other two-phase switching elements, based on the sinusoidal modulation voltage command value, and a PWM signal generation unit which generates a PWM signal PWM-controlling the three-phase inverter circuit, based on the discontinuous modulation voltage command value, wherein the inter-line modulation operation unit calculates the surge voltage value of each phase from the parasitic inductance of the circuit and the phase current of the motor to derive the phase in which the surge voltage value becomes maximum, thereby fixing the switching element of the phase having the maximum surge voltage value to an ON or OFF state.

7. The power conversion device according to claim 2, wherein the motor drives a compression mechanism of an electric compressor.

8. The power conversion device according to claim 3, wherein the motor drives a compression mechanism of an electric compressor.

9. The power conversion device according to claim 4, wherein the motor drives a compression mechanism of an electric compressor.

\* \* \* \* \*